United States Patent

[11] 3,587,703

[72] Inventor Jean Hanus
     Montlucon, France
[21] Appl. No. 741,050
[22] Filed June 28, 1968
[45] Patented June 28, 1971
[73] Assignee The Dunlop Company Limited
     London, England
[32] Priority July 5, 1967
[33] France
[31] 113,147

[54] GIANT TIRES
     18 Claims, 15 Drawing Figs.
[52] U.S. Cl. ................................................. 152/209,
                                                        152/361
[51] Int. Cl. ................................................. B60c 11/08

[50] Field of Search ............................................. 152/209,
                                                                    361

[56]            References Cited
          UNITED STATES PATENTS
3,237,669  3/1966  Travers ........................ 152/209

Primary Examiner—James B. Marbert
Attorney—Stevens, Davis, Miller & Mosher

ABSTRACT: A pneumatic tire provided with a tread comprising a plurality of sets of inclined bars disposed one set on each side of the midcircumferential plane of the tire in opposed directions one set with respect to the other, the wearing properties of one set being asymmetric with respect to the other, set such that substantially even wear ensures during road use of which the following is a specification.

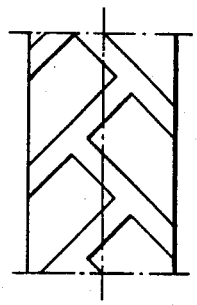
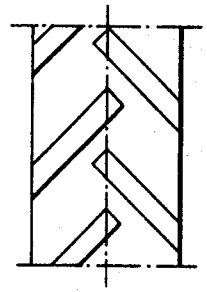
FIG. 2    FIG. 1
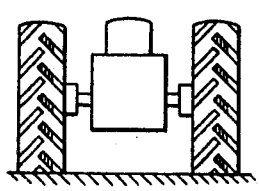
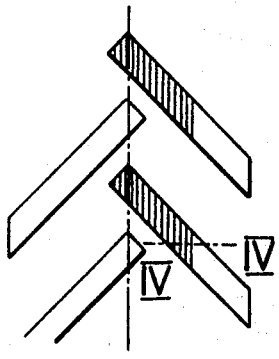
FIG. 3    FIG. 4

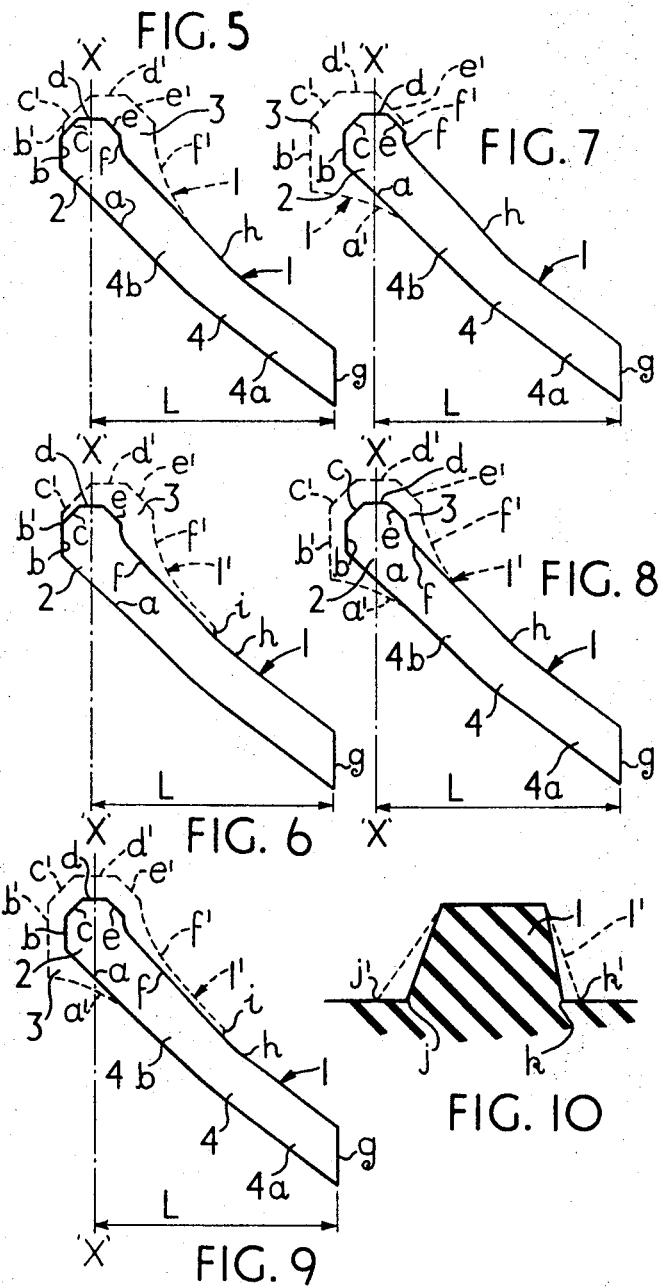

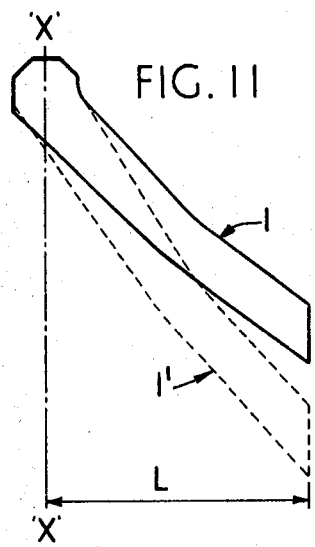
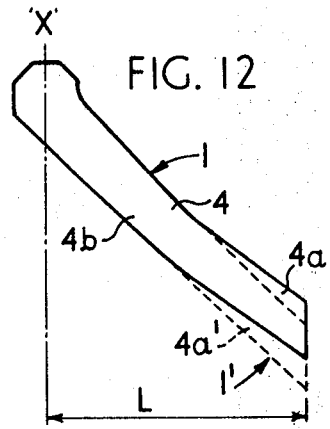
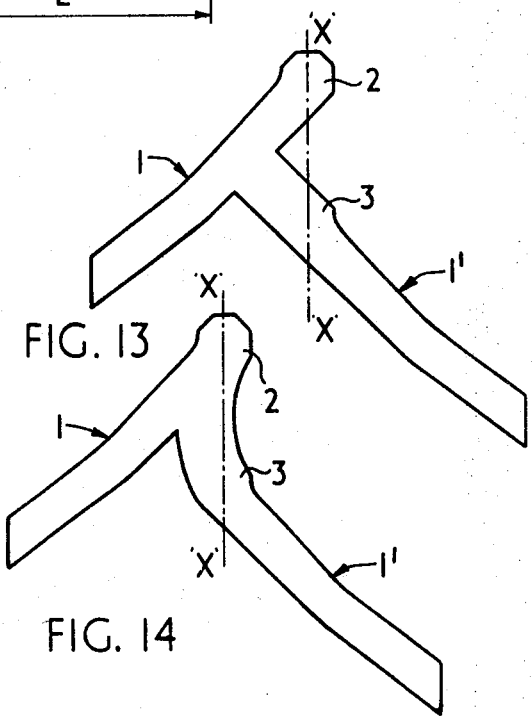
FIG. 11
FIG. 12
FIG. 13
FIG. 14

GIANT TIRES

This invention relates to pneumatic tires and more particularly to unidirectional giant tires, as used for example on the drive wheels of agricultural tractors.

By the expression "unidirectional tire" is meant a tire that operates satisfactorily in one direction of rotation only.

Pneumatic tires of the type generally fitted to the drive wheels of vehicles such as agricultural tractors, are generally provided with treads having long, yet relatively narrow, lugs of rubber extending in a generally axial sense with respect to the tire on the radially outer surface thereof, and commonly termed "bars.".

Said bars, in addition to providing substantial adherence on loose surfaces, must also exhibit good wear resisting properties, particularly when used on road surfaces.

Said bars are generally arranged on each side of the midcircumferential plane of the tire, and may or may not be connected at their axially inner ends, near or at the midcircumferential plane, to yield so called "closed" or "open center" tires, respectively.

Practice has shown that improved traction on loose surfaces may be achieved by the use of said open center tires. However, such tires are more prone to uneven tread wear when used on road surfaces. Both said types of tire, however, exhibit said uneven wear.

It has been found that the uneven wear is related to the camber of the road over which the tire rolls and more specifically that that side of the tire axially outermost of the center of the road suffers relatively more wear. Said uneven wear of the tire results in local bevelling of the axially inner portion of the bars located on said "wear prone" side of the tire. This is illustrated in FIGS. 4 and 4a. Said uneven wear results in premature replacement of the tire.

Such uneven wear can be compensated for with "bidirectional tires" since the wheels, and thus the tires, on either side of the vehicle, may be interchanged.

It is an object of the present invention to reduce or substantially eliminate said disadvantage.

According to the present invention on a pneumatic tire is provided with a tread comprising a plurality of sets of inclined bars disposed one set on each side of the midcircumferential plane of the tire in opposed directions one set with respect to the other, the dimensions and/or arrangement and/or the composition of the one set compared with the other being such as to create asymmetry in the wearing properties of the tread axially thereof.

Preferably the said asymmetry is effected by increasing the ground-contacting surface of the bars in the one set compared with the other.

Preferably the relative increase in the ground-contacting surface of the bars of one set is between 10 and 40 percent and may be as high as 100 percent of the ground-contacting surface of the bars of the other set.

Said increase in ground-contacting surface of said one set of bars may be effected by increasing the ground-contacting surface of the axially inner portion of each of said bars.

Said increase in ground-contacting surface of axially inner portion of each of said bars in the set may be effected by a circumferential extension of said portion in a direction corresponding to the direction of rotation of the tire during use of the tire.

Preferably the axial extent of each of said bars over which said circumferential extension is carried out is between 10 percent and 30 percent of the total tread width measured from the midcircumferential plane of the tire.

Preferably said circumferential extension of said axially inner portion of each of said bars measured along a circumferential line is up to 50 percent of the circumferential extent of a corresponding axially inner portion of a bar of the other set.

In addition said increase in ground-contacting surface of the axially inner portion of each of said bars of said set may be affected by axial extension of said portion.

Preferably said axial extension is between 10 and 50 percent of the axial extent of a corresponding portion of a bar of the other set.

Said increase in ground-contacting surface of the bar as a whole may be effected by increasing the length of each bar of a set, and to accommodate the increase in length, the angle of inclination of said each bar with respect to the midcircumferential plane of the tire is reduced.

Alternatively said asymmetry is effected by increasing the rigidity of the bars of one set.

This may be effected by constructing the bars of said set of a rubber composition harder than that used in the construction of the bars of the other set and may be up to 50 percent more hard when measured in terms of Shore hardness.

Alternatively said increase in rigidity may be effected by providing the bars of said set with wider base portions than the bars of the other set, said difference in base width may be as high as 45 percent of the base width of the bars of the other set.

Alternatively said increase in rigidity may be effected by extension of the axially inner ends of each bar of one set and connection with the axially opposed and leading bar.

Embodiments of the invention will now be described with reference to the accompanying drawings wherein:

FIG. 1 shows a plan view of a conventional "open center" tractor tire;

FIG. 2 shows a plan view of a conventional "closed center" tractor tire;

FIG. 3 shows a rear view of a tractor fitted with open center pneumatic tires on the drive wheels thereof, the shaded areas on the bars of the tire representing regions of preferential wear. It should be noted that the vehicle shown in the drawing is of the left-hand drive type and is driven on the right side of the road;

FIG. 4 shows a more detailed view of the bars of either of the tires illustrated in FIG. 3;

FIG. 5 shows in plan view an unmodified bar in solid line and a superimposed dotted-line view of a modified bar according to a first embodiment of the invention;

FIG. 6 shows in plan view a first modification of the first embodiment;

FIGS. 7, 8 and 9 show in plan view a second, third and fourth modification of the first embodiment;

FIG. 10 shows in superimposed relationship a cross-sectional view of a modified bar in dotted line and an unmodified bar in solid line according to a second embodiment;

FIGS. 11 and 12 show an unmodified bar of a tire in solid line and a superimposed dotted-line view of a modified bar according to a third embodiment;

FIGS. 13 and 14 show in plan view a pair of connected bars according to a fifth embodiment and a modification thereto, respectively.

Figure 4A:
FIG. 4a shows a cross-sectional view of a bar illustrated in FIG. 4 along a line IV—IV drawn axially of the tire through a worn bar.

According to a first embodiment of the invention illustrated in FIG. 5 a pneumatic tire of the type fitted to the drive wheels of agricultural tractors, is provided with a plurality of bars 1 and 1', disposed respectively on opposite sides of the midcircumferential plane of the tire in circumferentially equally-spaced-apart relationship. Each bar is substantially parallel to its immediate circumferential neighbors and is inclined at an angle of the order of 50° to the midcircumferential plane X—X of the tire, the bars 1 on one side of the tire being inclined in an opposite sense with respect to the bars 1' on the other side of the said plane. The axial extend L of each bar is substantially one-half the width of the tire tread so that the axially inner end 2 or 3 of each bar 1 or 1' respectively lie on the midcircumferential plane X—X of the tire, the bar pattern on each side of said plane being circumferentially offset as shown in the tire illustrated in FIG. 1.

Each bar 1 or 1' comprises two parts viz a stem portion 4 and a head portion 2 or 3. The stem portion 4 of the bar 1 or 1' is defined as the long relatively narrow parallel sided portion of the bar and is the axially outer portion of the bar. The axially inner limb 4b of the stem 4 is slightly inclined to the axially outer limb 4a thereof, so that the axially inner limb 4b of the stem 4 is relatively more inclined to the midcircumferential plane X-X.

The head portion 2 or 3 of each bar 1 or 1' is defined as that portion of the bar which is substantially wider than the remainder thereof and which is located at the axially innner end of the bar. In the present embodiment, said asymmetry according to the invention, introduced to counteract the preferential wear that such tires suffer, is introduced therein by construction of the head portions 3 of the bars 1' on that side of the midcircumferential plane X-X that normally suffers said preferential wear of increased ground-contacting surface to the head portions 2 of the bars 1 located on the other side of said plane. The head portions 2 of those bars 1 located on that side of the tire not subject to preferential wear will now be described. Said bars 1 will be referred to herein as unmodified bars. The said increase in width of the bar that distinguishes the head portion 3 from the stem portion 4 takes place uniquely on the leading edge c and e of the axially inner region of the bar, and is visible as a generally circumferentially extending projection. The edges b and g are substantially parallel and extend substantially circumferentially of the tire, the union between said circumferential edges b and g and the trailing edge a of the bar 1 is sharp and uncurved while the axially outwardly leading edge f of said head portion of the bar blends smoothly into the axially inner leading edge portion L of the said relatively more inclined arm of the stem.

The leading edge of the head portion comprises four discrete edges b, c, d and e including the said axially inwardly circumferentially extending edge b, arranged in the form of four consecutive sides of a regular octagon, such that two of the sides c and e are inclined at an angle of approximately 45° to a circumferential line, and the third edge d the outermost edge that first contacts the running surface during use of the tire is disposed substantially axially of the tire. The said head portion 2 is generally symmetrically disposed about the midcircumferential plane X-X of the tire.

The bars 1' on that side of the tire with respect to the midcircumferential plane thereof that in practice suffer preferential wear, as already mentioned are constructed with a greater ground-contacting surface by increasing the size of the head portion 3 of said bar 1'.

Said enlarged head portion 3 of said bar 1' is substantially of similar form to an unmodified bar 1 located on the opposite side of the midcircumferential plane X-X of the tire. However, the axial extent L of all of the bars is substantially equal, said enlargement of said head portion 3 being effected, substantially circumferentially of the head portion on the leading edge c, d and e thereof and axially outwardly thereof, so that the head portions of bars of this type are not symmetrically located about the midcircumferential plane of the tire but disposed axially outwardly thereof.

The leading edge f' of the bar 1' as with the unmodified bar 1 joins the portion of the stem 4b smoothly so that no discrete boundary occurs between the stem 4b and the head portion 3.

If L represents half the total tread width of the tire then the axial extent of said enlarged head portion measured from the midcircumferential plane of the tire is approximately 0.50 L whereas that of the head portion of the bars disposed on the opposite side of the midcircumferential plane of the tire is 0.11 L.

If the circumferential extent of each head portion of the bars disposed on that side of the midcircumferential plane of the tire not prone to preferential tread wear is ad and that of the enlarged head portion of the bars on that said of the midcircumferential plane of the tire prone to preferential tread wear is $ad^1$ the ratio of ad to $ad^1$ is approximately 1.28.

In a first modification illustrated in FIG. 6 of the first embodiment of FIG. 5, the form of the enlarged head portion 3 of the bar 1' disposed on that side of the midcircumferential plane X-X of the tire prone to preferential wear is similar to that described in the first embodiment, but instead of the leading edge f' of the head portion 3 of the bar 1' tapering smoothly into the leading edge L of the stem portion 4b, a discrete boundary occurs therebetween characterized by a narrow circumferentially extending edge i located therebetween.

In a second modification shown in FIG. 7 of the first embodiment the said enlargement of the head portion 3 of the bars 1' disposed on that side of the tire that suffers preferential wear is effected in addition by an enlargement of the head portion axially inwardly of the bar, so that head portion is not symmetrically disposed about the midcircumferential plane of the tire but disposed in a direction axially inwardly of the bar with respect to said plane X-X.

In a third modification shown in FIG. 8 of the first embodiment enlargement of the head portion 3 is effected by enlargement axially inwardly of said bar 1', but not axially outwardly thereof. Symmetry of disposition of said enlarged head portion 3 however is achieved with respect to the midcircumferential plane.

In a different form shown in FIG. 9 of the third modification of the third embodiment, the leading edge f'h of the bar 1' between the head portion 3 and the stem 4b thereof is discontinuous, a discrete boundary i existing therebetween in the form of a narrow circumferentially extending step in the said edge f'h.

In a second embodiment according to the invention, illustrated in FIG. 10, a pneumatic tire of the type described in the first embodiment of the invention is provided with a plurality of bars 1 and 1' arranged on the radially outer surface in a manner substantially as described in the first embodiment of the invention. However, the bars disposed on that side of the midcircumferential plane of the tire prone to preferential thread wear are of a more rigid construction than those disposed on the other side thereof. This is achieved by providing each of said bars 1' with a wider base j'k' than those disposed on the other side of the midcircumferential plane of the tire jk. The bars 1 and 1' on both sides of the midcircumferential plane of the tire however have substantially the same ground-contacting surface though it will be appreciated that this increases to the one side by wear of the wider base bars.

If j'k' is the width of the base of each of the bars 1' disposed on that side of the midcircumferential plane of the tire prone to preferential tread wear, and jk is the width of each of the bases disposed on the opposite side thereof then the ratio j'k' to jk is 1.41.

In a third embodiment of the invention illustrated in FIG. 11, a pneumatic tire of the type described in the first embodiment is provided with a plurality of bars 1 and 1' arranged on the radially outer surface thereof in a manner substantially as described in the first embodiment of the invention. However, unlike the bars of the first embodiment of the invention, the bars on opposite sides of the midcircumferential plane of the tire are of different lengths each bar 1' disposed on that side of the midcircumferential plane of the tire prone to preferential tread wear being longer than each bar 1 disposed on the opposite side thereof. The said increased length of some of the bars is accommodated on the tire half tread L by arranging the said longer bars at a relatively smaller angle of inclination to the midcircumferential plane of the tire.

In a modification shown in FIG. 12, of the third embodiment, the increase in length of the bar is effected by arranging the axially outer limb 4a of each stem portion of each bar 1' at substantially the same angle of inclination to the midcircumferential plane X-X of the tire as that of the axially inner limb 4b of i.e. the stem portion 4 of each bar 1' on that side of the tire susceptible to preferential wear comprises a substantially linearly extending member.

In a fourth embodiment of the invention not illustrated a pneumatic tire of the said type is provided with a plurality of bars arranged on the radially outer surface thereof in a manner substantially as described in the first embodiment. However, the dimensions of the bars disposed on the side of the midcircumferential plane of the tire are substantially equal to those disposed on the other side thereof, the asymmetry being effected by constructing the bars on said wear prone side of the midcircumferential plane of the tire of a rubber composition more hard and more wear resistant than that of the bars disposed on the other side thereof, said in the present embodiment, the ratio of the two hardnesses, each of which is measured in degrees Shore, is 1.50.

In a fifth embodiment of the invention illustrated in FIG. 13, a pneumatic tire of the type described in the first embodiment of the invention is provided with a plurality of bars 1 and 1' arranged in a manner substantially as described in the first embodiment of the invention.

However, instead of the head portion 3 of each bar 1' disposed on that side of the midcircumferential plane prone to preferential wear being enlarged, in the present embodiment it is of substantially the same width as those on the other side thereof, and reinforcement is effected by a union between each said head portion and the stem portion of the bar 1 directly adjacent and circumferentially leading said each bar 1'.

In this way said bars are braced by the axially spaced and leading bars causing reduced flexibility of said bars and consequently increased wear resistance.

The union takes the form of a rectilinear extension of the head portion in a direction substantially equal to the direction of longitudinal axis of the axially inner limb of the stem portion of the bar and results in an integral lug extending across the whole tread width.

In a modification of the fifth embodiment of the invention the said union between the two bars takes place between the two head portions 2 and 3 of the said bars 1 and 1' and comprises a curvilinear extension of the head portion 3 of the circumferentially trailing bar 1' substantially along the midcircumferential plane X-X to join the head portion 2 of the circumferentially leading bar.

I claim:

1. A pneumatic tire provided with a tread comprising a plurality of sets of inclined bars disposed one set of bars on each side of the midcircumferential plane of the tire in opposed directions one set with respect to the other, the wearing properties of the set of bars on one side of the midcircumferential plane of the tire being enhanced relative to the wearing properties of the set of bars on the other side thereof.

2. A pneumatic tire according to claim 1 wherein the wearing properties of the set of bars on one side of the midcircumferential plane are enhanced relative to those of the set from the other side by increasing the ground-contacting surface of the bars in the one set compared with the other.

3. A pneumatic tire according to claim 2 wherein said increase in ground-contacting surface of the bars of one set is 10 to 30 percent of the ground-contacting surface of the bars of the other set.

4. A pneumatic tire according to claim 2 wherein said increase in ground-contacting surface of said one set of bars is effected by increasing the ground-contacting surface of the axially inner portion of each of said bars.

5. A pneumatic tire according to claim 4 wherein said increase in ground-contacting surface of the axially inner portion of each of said bars in the set is effected by a circumferential extension of the leading edge of said axially inner portion of each of said bars.

6. A pneumatic tire according to claim 5 wherein the axial extent of the bar over which said circumferential extension is carried out is between 10 and 30 percent of the total tread width measured from the midcircumferential plane of the tire.

7. A pneumatic tire according to claim 5 wherein the said circumferential extension of said axially inner portion of each of said bars of the set measured along a circumferential line is up to 50 percent of the circumferential extent of a corresponding axially inner portion of a bar of the other set.

8. A pneumatic tire according to claim 4 wherein the increase of ground-contacting surface of the axially inner portion of each of said bars of the set is effected by axial extension of said portion.

9. A pneumatic tire according to claim 8 wherein said axial extension of said axially inner portion of each of said bars of the set is between 10 and 50 percent of the axial extent of a corresponding portion of a bar of the other set.

10. A pneumatic tire according to claim 2 wherein said increase in ground-contacting surface is effected by reducing the angle of inclination of each of said bars of a set and increasing the length thereof relative to that of each of the bars of the other set.

11. A pneumatic tire according to claim 1 wherein the wearing properties of the set of bars on one side of the midcircumferential plane are enhanced relative to those of the set from the other side by increasing the rigidity of the bars of one set compared with the other.

12. A pneumatic tire according to claim 11 wherein said increase in rigidity of the one set of bars is effected by increasing the hardness of the rubber composition of said bars.

13. A pneumatic tire according to claim 12 wherein the hardness of the said composition is from 10 to 50 percent greater.

14. A pneumatic tire according to claim 11 wherein said increase in rigidity is effected by providing the bars of one set with wider base portions than the bars of the other set.

15. A pneumatic tire according to claim 14 wherein the said wider base portions are 10 to 45 percent wider than the base portions of the other set.

16. A pneumatic tire according to claim 11 wherein said increase in rigidity is effected by extension of the axially inner end of each bar of one set with the corresponding end of a bar of the other set.

17. A pneumatic tire according to claim 16 wherein said extension is rectilinear.

18. A pneumatic tire according to claim 16 wherein said extension is curvilinear and extends generally circumferentially.